D. G. KNITTEL.
TRACTOR.
APPLICATION FILED MAY 28, 1919.
1,361,876.
Patented Dec. 14, 1920.
2 SHEETS—SHEET 2.
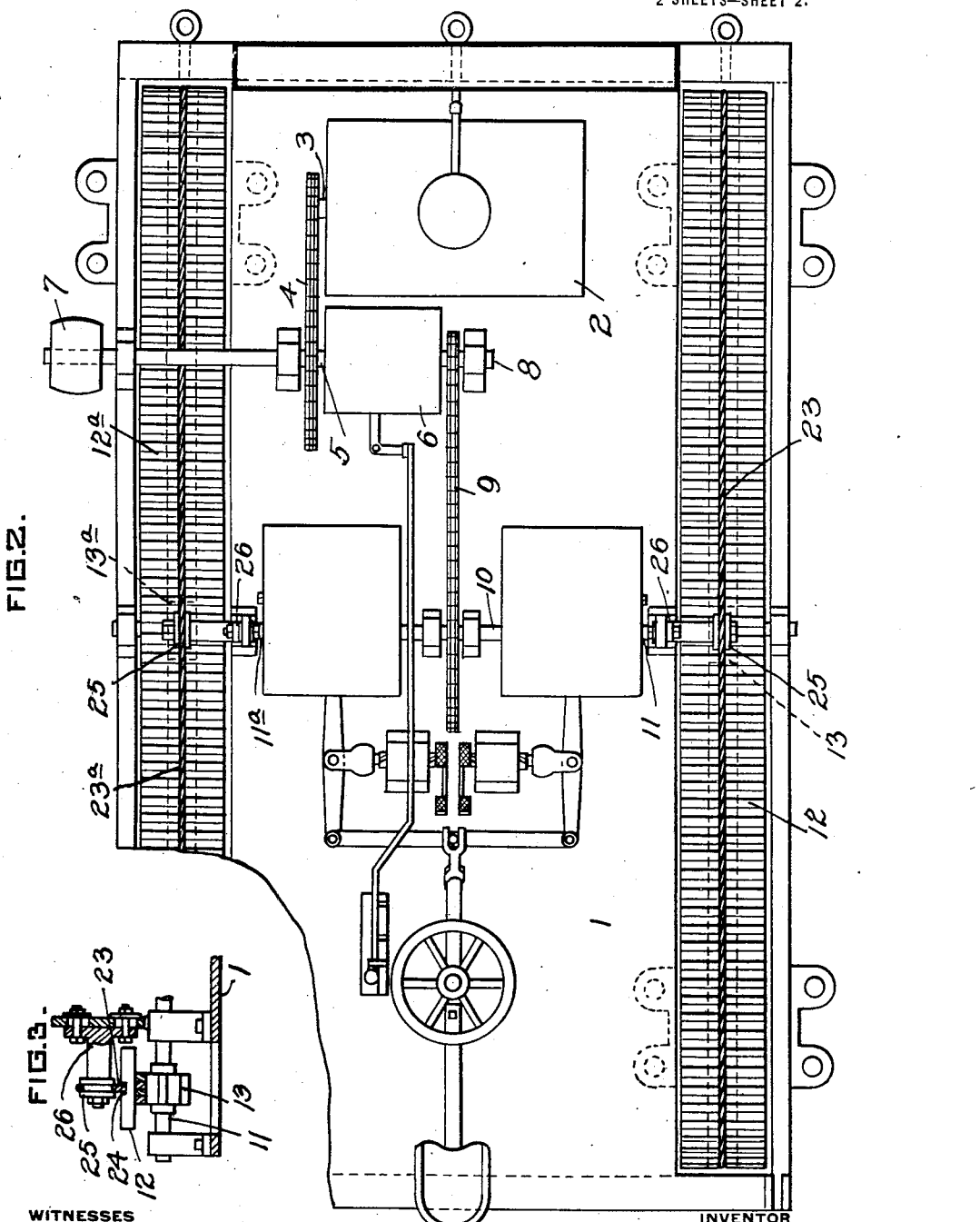
WITNESSES
INVENTOR

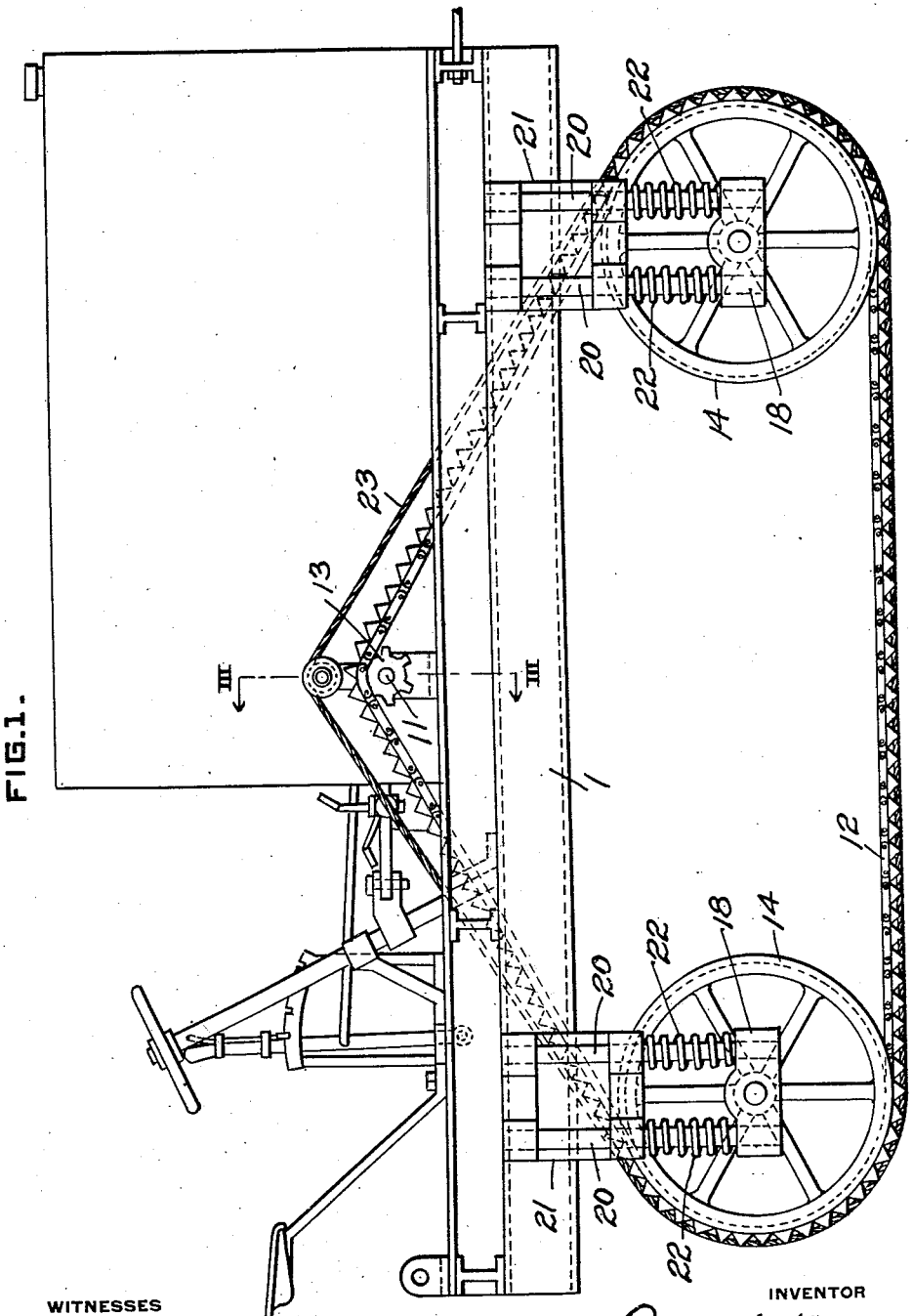

UNITED STATES PATENT OFFICE.

DAVID G. KNITTEL, OF WILDWOOD, PENNSYLVANIA, ASSIGNOR TO KNITTEL KRAWLING TRACTOR COMPANY, OF PITTSBURGH, PENNSYLVANIA, A CORPORATION OF DELAWARE.

TRACTOR.

1,361,876.  Specification of Letters Patent.  Patented Dec. 14, 1920.

Application filed May 28, 1919. Serial No. 300,311.

*To all whom it may concern:*

Be it known that I, DAVID G. KNITTEL, residing at Wildwood, in the county of Allegheny and State of Pennsylvania, a citizen of the United States, have invented or discovered certain new and useful Improvements in Tractors, of which improvements the following is a specification.

My invention relates to tractors which are propelled by caterpillar drivers, and the object thereof is to provide means for preventing lateral skidding of such tractors, chiefly to the end that they may be guided in a straight line when operating or driving farm implements upon the side of a hill.

In the accompanying sheets of drawings I have illustrated the preferred embodiment of my invention. Figure 1 is a side view of a tractor having caterpillar drivers; Fig. 2 a plan view thereof; and Fig. 3 a detail sectional view to enlarged scale, the plane of view being indicated by the line III, III, Fig. 1.

The tractor which, for the purpose of illustrating my invention, is shown in the drawings, includes a frame 1 upon which there is mounted a motor 2 of any desired type or construction. A sprocket chain 4 connects the crank shaft 3 of the motor with a shaft 5, one end of which extends into a gear box 6. At the outer end of the shaft 5 there is provided a pulley 7 whereby the motor 2 may be used to drive machinery, as for example, a threshing machine. A shaft 8 projecting from the other end of the gear box 6 is connected by means of a sprocket 9 with a driving shaft 10, which, through suitable clutch connections, is adapted to drive driven shafts 11 and 11ª either simultaneously or independently in either direction. The clutches and means for controlling them are fully shown and described in my co-pending application Serial No. 300,310, filed of even date herewith.

The caterpillar drivers contemplated by my invention may be driven in any well known or desired manner. Preferably they are driven by means of sprockets 13, 13ª secured to the shafts 11 and 11ª. Over each of these sprockets and around a pair of wheels 14 there extends a caterpillar driver 12 constructed in the usual or any desired manner of a plurality of links. For holding the wheels 14 yieldingly away from the frame 1 each wheel is mounted in a bearing 18, to which there are attached vertically disposed pins 20 which extend upwardly through housings 21 secured to the frame 1, coiled springs 22 being arranged between the bearing blocks 18 and the housings 21.

In the practice of my invention the caterpillar driver is provided with means for preventing lateral sliding or skidding of the tractor. For such purpose I preferably provide an endless cord 23 which extends around the caterpillar driver, the tread face of which may be transversely fluted and provided medially with a longitudinally disposed groove 24 in which the cord lies in the active portion of the driver, it being understood that such active portion is the extent of the caterpillar driver which bears upon the road or other supporting surface of the tractor. The cord 23 may be constructed of a suitable link chain, wire cable, or any other desired flexible structure, and the depth of the groove 24 is such that the outer edge of the cord lies between the inner and outer extremities of the flutes formed on the face of the driver.

Means are provided for holding the cord above the face of the inactive portion of the driver, that is to say, the portion of the driver which does not bear upon the road or other tractor supporting surface. Such means preferably consists of an idler 25 secured to an arm 26 mounted for vertical adjustment in the tractor frame 1. By thus causing the cord to move out of the groove 24, mud or other accumulations of foreign matter are removed from the fluted face of the driver so that as the inactive portion of the driver becomes active, the fluted face thereof will have better tractive power.

In the practice of my invention it has been found that a caterpillar-driver tractor provided with a flexible cord may be driven along the side of a hill in farm country without deviating from a straight line, whereas the same tractor without the flexible cord, when driven along the same course, will slide laterally.

Accordingly to the provisions of the patent statute I have described the principle and operation of my invention together with the construction which I now consider to represent the best embodiment thereof.

However, I desire to have it understood that, within the scope of the appended claims, my invention may be practised by other forms of construction than that specifically shown and described.

I claim as my invention:

1. In a tractor the combination, with a frame and a motor carried thereby, of a driving member whose road-engaging face consists of two parts, the one affording traction in the line of travel, the other adapted to resist skidding transversely of the line of travel, the said parts being movable, one relatively to the other, as the road-engaging face leaves the roadway, whereby said driving member in operation frees itself of material picked up from the roadway, substantially as described.

2. In a tractor, the combination with a frame and a motor carried thereby of an endless caterpillar driver operatively connected to said motor for propelling the tractor, a flexible endless cord extending around and movable with said driver, and means for holding said cord above the face of the inactive portion of said driver.

3. In a tractor, the combination with a frame and a motor carried thereby, of an endless caterpillar driver operatively connected to said motor for propelling the tractor, said driver having a transversely fluted tractive face provided medially with a groove disposed longitudinally of said face, a flexible endless cord extending around and movable with said driver, said cord lying in said groove in the active portion of said driver, and means for removing said cord from said groove in the inactive portion of said driver.

4. In a tractor, the combination with a frame and a motor carried thereby, of an endless caterpillar-driver, operative connection from said motor to said driver for propelling the tractor, a guide arranged above the inactive portion of said driver, and an endless cord sustained by said driver in skid-preventing position upon the active portion of the driver and extending over said guide above the inactive portion of said driver.

In testimony whereof I have hereunto set my hand.

DAVID G. KNITTEL.

Witnesses:
ALICE A. TRILL,
PAUL N. CRITCHLOW.